(12) United States Patent
Hutten-Czapski

(10) Patent No.: US 11,052,920 B2
(45) Date of Patent: *Jul. 6, 2021

(54) SYSTEM AND METHOD FOR MITIGATING UNINTENDED OPERATION

(71) Applicant: BlackBerry Limited, Waterloo (CA)

(72) Inventor: Christopher Hutten-Czapski, Waterloo (CA)

(73) Assignee: BlackBerry Limited, Waterloo (CA)

( * ) Notice: Subject to any disclaimer, the term of this patent is extended or adjusted under 35 U.S.C. 154(b) by 389 days.

This patent is subject to a terminal disclaimer.

(21) Appl. No.: 15/383,898

(22) Filed: Dec. 19, 2016

(65) Prior Publication Data

US 2017/0096147 A1    Apr. 6, 2017

Related U.S. Application Data

(63) Continuation of application No. 14/168,873, filed on Jan. 30, 2014, now Pat. No. 9,522,682.

(51) Int. Cl.
*B60W 50/08* (2020.01)
*B60W 50/00* (2006.01)
*H04W 4/48* (2018.01)

(52) U.S. Cl.
CPC ...... *B60W 50/087* (2013.01); *B60W 50/0098* (2013.01); *H04W 4/48* (2018.02)

(58) Field of Classification Search
None
See application file for complete search history.

(56) References Cited

U.S. PATENT DOCUMENTS

| | | | | |
|---|---|---|---|---|
| 8,682,533 | B2 * | 3/2014 | Kojima | B60W 30/12 701/42 |
| 10,222,796 | B2 * | 3/2019 | Ichikawa | G05D 1/0061 |
| 2004/0098197 | A1 * | 5/2004 | Matsumoto | B62D 1/286 701/301 |
| 2011/0183601 | A1 * | 7/2011 | Hannon | H04W 4/021 455/1 |
| 2012/0021777 | A1 | 1/2012 | Lazaridis et al. | |
| 2012/0221209 | A1 * | 8/2012 | Tatsukawa | B60W 50/087 701/42 |
| 2012/0239255 | A1 * | 9/2012 | Kojima | B62D 15/025 701/42 |

(Continued)

OTHER PUBLICATIONS

EPO, EP Examination Report relating to EP application No. 15153077. 1, dated Sep. 21, 2018.

(Continued)

*Primary Examiner* — Frederick M Brushaber
(74) *Attorney, Agent, or Firm* — Rowand LLP

(57) ABSTRACT

A system and method for mitigating unintended operation of a vehicle is described herein. The system and method analyze data and/or signals received from sensors to determine when the vehicle is experiencing changes the in the vehicle's direction, dynamic state and/or status. The analysis may be applied to data and/or signals from one or more sensors alone or in combination. Analysis of the data and/or signals may determine that one or more criterion are met and therefore the vehicle may be an identified state. When the vehicle is in an identified state, the system and method may disable, deaden or otherwise modify the response to one or more controls in order to mitigate unintended operation.

20 Claims, 4 Drawing Sheets

(56) References Cited

U.S. PATENT DOCUMENTS

| | | | |
|---|---|---|---|
| 2012/0323690 A1* | 12/2012 | Michael | G01C 21/3461 |
| | | | 705/14.58 |
| 2013/0076499 A1* | 3/2013 | Okita | B60K 35/00 |
| | | | 340/438 |
| 2013/0123066 A1* | 5/2013 | Tomiie | B60W 50/087 |
| | | | 477/185 |
| 2014/0005884 A1 | 1/2014 | Hampiholi | |
| 2014/0309871 A1* | 10/2014 | Ricci | B60R 25/00 |
| | | | 701/36 |
| 2014/0309872 A1* | 10/2014 | Ricci | A61B 5/7405 |
| | | | 701/36 |
| 2016/0001781 A1* | 1/2016 | Fung | B60K 28/02 |
| | | | 701/36 |
| 2017/0120887 A1* | 5/2017 | Kurahashi | B60Q 1/0076 |
| 2017/0210391 A1* | 7/2017 | Dudar | B60H 1/00064 |
| 2017/0315550 A1* | 11/2017 | Ichikawa | B60W 60/0051 |

OTHER PUBLICATIONS

EPO, EP Examination Report relating to EP application No. 15153077.1, dated Feb. 6, 2019.

\* cited by examiner

SYSTEM AND METHOD FOR MITIGATING UNINTENDED OPERATION

PRIORITY CLAIM

This application is a continuation application of U.S. Ser. No. 14/168,873, filed Jan. 30, 2014, which is incorporated herein by reference.

BACKGROUND

Technical Field

The present disclosure relates to the field of in-vehicle controls. In particular, to a system and method for mitigating the unintended operation of in-vehicle controls.

Related Art

Many types of vehicles have vehicle-operator interfaces that include one or more controls to be operated by the operator or occupants of the vehicle. The controls may, for example, take the form of buttons, levers, knobs, touch-sensitive surfaces and other similar control types.

Due, at least in part, to the dynamic nature of vehicle motion and the focus demanded by operation of the vehicle, in some circumstances controls may be unintentionally actuated or operated by the driver or occupants of the vehicle. In an illustrative example for an automobile equipped with steering wheel mounted controls, a driver may unintentionally operate a steering wheel mounted control (e.g. hands-free call termination, audio volume up or down, cruise control set) as a result of hand-over-hand movement when making a tight turn. The unintended operation of the controls may result in driver frustration, driver distraction or unsafe vehicle operation.

It is desirable to mitigate unintended operation of in-vehicle controls that may result in operator frustration, operator distraction or unsafe vehicle operation.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for mitigating unintended operation of in-vehicle controls is described herein. The system and method analyze data and/or signals received from sensors to determine when the vehicle is experiencing changes in the vehicle's direction, dynamic state and/or status. The analysis may be applied to data and/or signals from one or more sensors alone or in combination. Analysis of the data and/or signals may determine that one or more criterion are met and therefore the vehicle may be an identified state. When the vehicle is in an identified state, the system and method may disable, deaden or otherwise modify the response to one or more controls in order to mitigate unintended operation.

Many types of vehicles have vehicle-operator interfaces that include one or more controls intended to be actuated by the operator or occupants of the vehicle. The vehicle types may include automobiles, trucks, buses, motorcycles, snowmobile, watercraft, aircraft, and other similar vehicles that transport an operator and/or occupants. The controls may, for example, take the form of buttons, levers, knobs, touch-sensitive surfaces and other similar control types. The controls may operate various functions such as audio volume setting, media selection, playback mode, channel selection, cruise control activation/deactivation, cruise speed setting, hands-free call management, transmission gear selection, navigation system settings, climate control settings and other similar functions available for operation by the operator and/or occupants of the vehicle. Unintended operation of a control may include inadvertent operation or misoperation. Misoperation may include intend actuation of the control with unexpected or unintended results.

Figure 1:
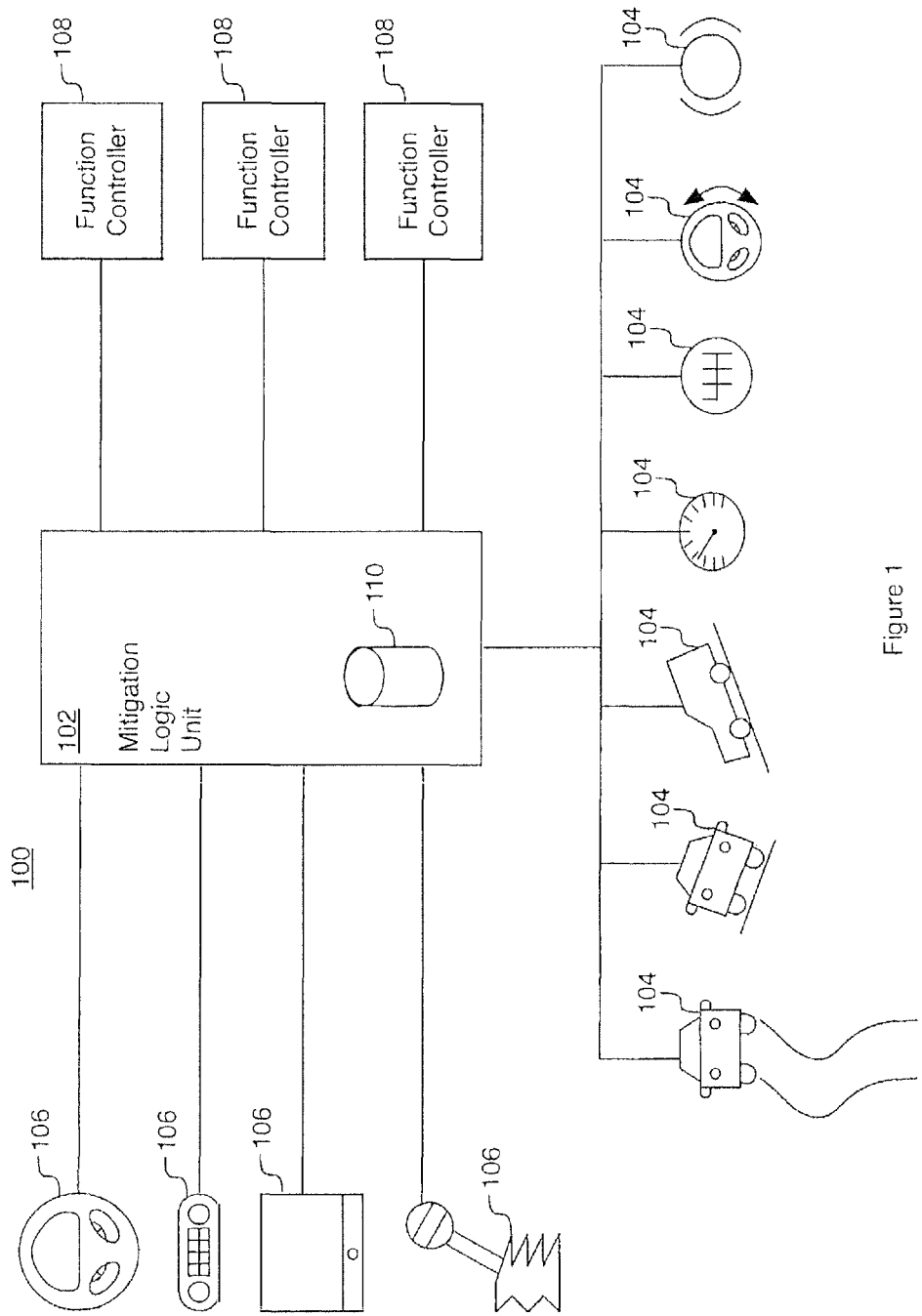
FIG. 1 is a schematic representation of a system for mitigating unintended operation of in-vehicle controls.

FIG. 1 is a schematic representation of a system for mitigating unintended operation of in-vehicle controls. The system 100 may include a mitigation logic unit 102, one or more sensors 104, one or more controls 106 and one or more function controllers 108. Each of the one or more controls 106 may be associated with one or more of the function controllers 108 and each of the one or more function controllers 108 may be associated with one or more of the controls 106. The sensors 104 provide input data and/or signals to the mitigation logic unit 102. The one or more sensors 104 may include sensors such as, for example, a steering wheel position sensor, an accelerometer (including a multi-axis accelerometer), yaw sensor, pitch sensor, roll sensor, inclination sensor, braking indicator, speedometer, skid detector, airbag deployment indicator and other similar vehicle sensors. The data and/or signals received by the mitigation logic unit 102 may be used alone or in combination to determine or infer changes in the vehicle's direction, dynamic state, and/or status. The data and/or signals received by the mitigation logic unit 102 may be stored including being stored as an historical sequence of data and/or signal values.

Changes in the vehicle's direction, dynamic state, and/or status such as turning, accelerating, braking or skidding may contribute to unintended operation of the controls 106 by the operator and/or the occupants. Changes in the vehicle's attitude or direction may cause the operator or occupants to be thrown forward, back or sideways making it difficult to operate controls 106 properly or causing inadvertent contact with one or more control 106.

Figure 2:
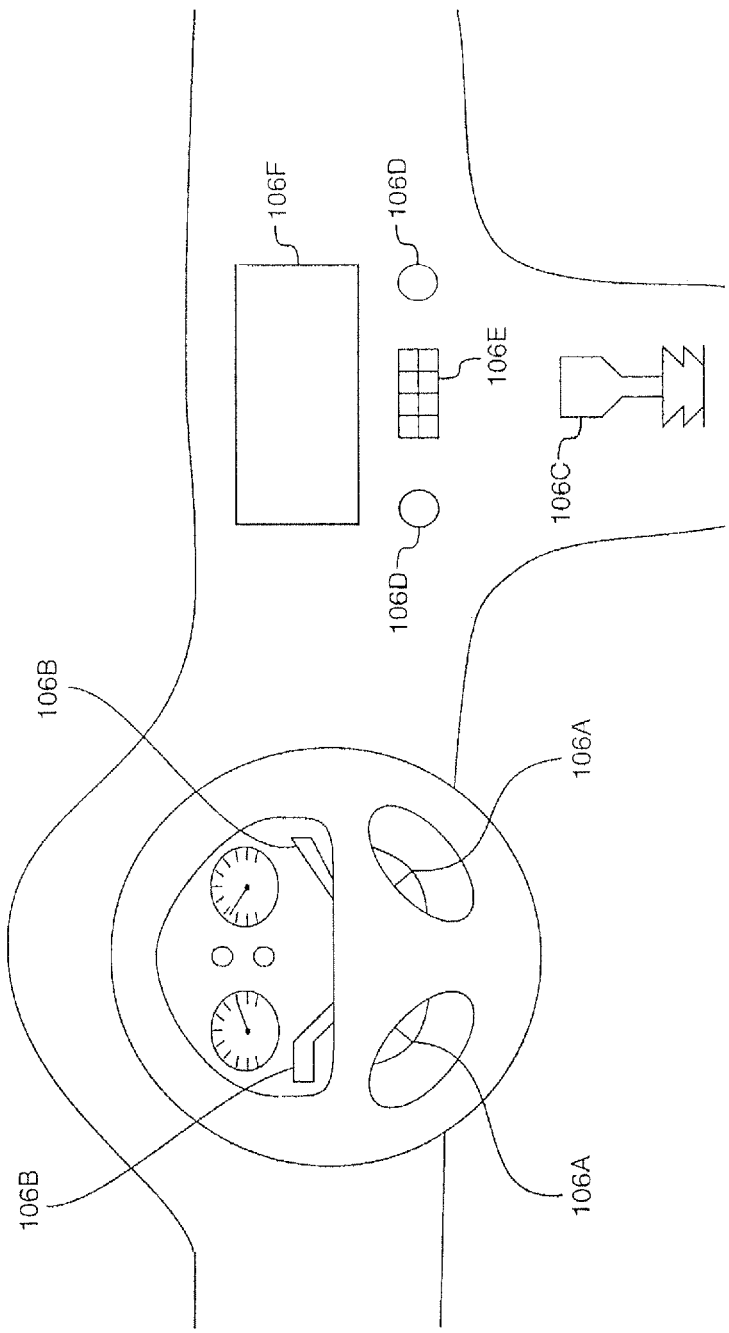
FIG. 2 is a schematic representation of example controls in an automobile.

FIG. 2 is a schematic representation of example controls in an automobile. Example controls (collectively 106) in an automobile cabin may include steering-wheel mounted buttons 106A, steering column stalks 106B, a gear shift lever 106C, dashboard mounted knobs 106D and buttons 106E, and a touch display interface 106F. These controls 106 may provide input data and/or signals to function controllers 108 for functions such as turn signals (aka direction indicators), wiper/washer system, audio/infotainment system, hands-free telephony, cruise control, drivetrain/gear selection, heating ventilation and cooling (HVAC), navigation and other similar vehicle functions. These example controls 106 are illustrative in nature and are not intended to be limiting in any way.

The mitigation logic unit 102 may analyze the data and/or signals received from the sensors 104 to determine when the vehicle is experiencing changes the in the vehicle's direction, dynamic state and/or status. The data and/or signals analyzed may be current value, historical values or combinations of both. The data and/or signal may be retrieved from a storage media 110. The storage media 110 may be integral to the mitigation logic unit 102, may be separate from the mitigation logic unit 102 or may be a combination of partially integral and partially separate. The analysis may be applied to data and/or signals from any of one or more sensors 104 alone or in combination. Analysis of the data and/or signals may determine that one or more criterion are met and therefore the vehicle may be in an identified state. When the vehicle is in an identified state, the system 100 may disable, deaden or otherwise modify the response to one or more controls 106. When the analysis determines that one or more of the criterion are no longer met, the identified state may be abated and the response to the one or more controls 106 may be restored to normal operation.

The one or more criterion (criteria) used in the analysis may include for example a steering-wheel angle exceeding a threshold (e.g. a tight turn) or the steering-wheel angle in combination with a vehicle speed (e.g. a speed-relative tight turn). Other example criteria may include yaw, pitch or roll indicators exceeding a threshold or a rate of change of any of these exceeding a threshold (e.g. vehicle skid or roll-over occurring or imminent). Further example criteria may include an incoming call indication, navigation system instructional prompt indication, rough road surface detected, braking exceeding a threshold, acceleration exceeding a threshold and other similar criteria. The one or more criterion may be used to determine the on-set, and abatement, of one or more identifiable states. The identified states are typically, but not limited to, transient (e.g. having short time duration) in nature.

The mitigation logic unit 102 may have pre-determined, pre-programmed or user configurable response templates that include the criteria used to determine when an identified state occurs and what control interventions to take when the identified state occurs. The interventions may include disabling, deadening or otherwise modifying the response to one or more controls 106. The interventions may, for example, include disabling activation or changes in the operation of the windshield wipers, disabling activation or changes in the operation of the cruise control system, disabling inputs to the infotainment unit (e.g. volume, channel or track selection), disabling activation or changes in the operation of the hands free telephony system. Alternatively, the interventions may include deadening the response of a control by, for example, requiring a longer time duration operation (e.g. long button press) of the control to activate a corresponding function. Alternatively, or in addition, the intervention may include modifying the response to a control by, for example, requiring a further confirmation action after an initial control operation in order to activate a corresponding function. Further alternatively, or in addition, the intervention may include modifying the response to a control by, for example, disabling or modifying one or more modes available for activating a multi-modal controlled function. For example, a navigation function that normally accepts control inputs in multiple modes, such as touch-screen presses and voice commands, may only accept voice commands (but not touch-screen presses) when an identified state such as the vehicle swerving is occurring. The example interventions described therein are illustrative in nature and are not intended to be limiting in any way.

The interventions made by the mitigation logic unit 102 may be carried out by the mitigation logic unit modifying or cancelling an input from a control 106 before it reaches a corresponding function controller 108, by providing additional input to the function controller 108 to cause it to modify its response to the input received from the control 106, or by a combination of these two approaches. The mitigation logic unit 102 may intervene to concurrently modify the response provided by one or more function controllers 108 to inputs received from one or more controls 106.

Figure 3:
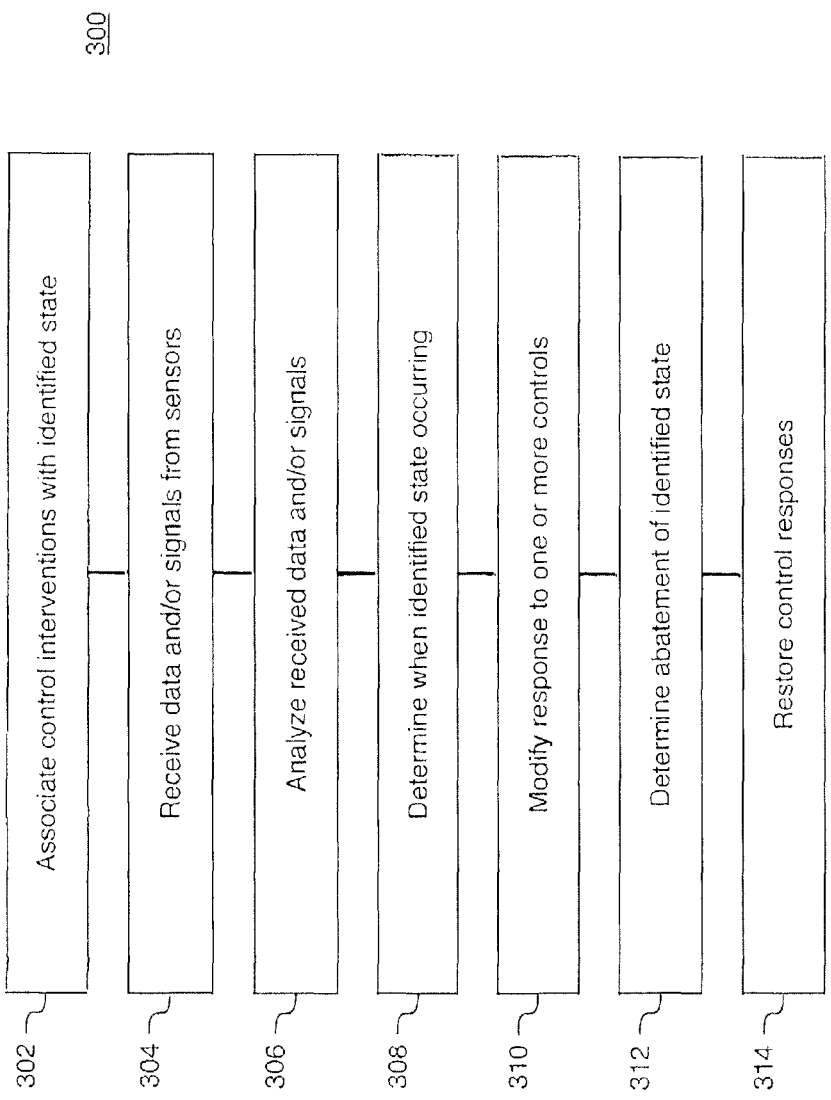
FIG. 3 is a flow diagram representing a method for mitigating unintended operation of in-vehicle controls.

FIG. 3 is a representation of a method for mitigating unintended operation of in-vehicle controls. The method 300 may be, for example, implemented using either of the systems 100 and 400 described herein with reference to FIGS. 1 and 4. The method 300 may include the following acts. Associating one or more control interventions with an identified state 302. The association of interventions for one or more controls 106 with each of one or more identified states may be pre-determined, pre-programmed or user configurable. In addition, associating interventions with an identified state nay include the criteria used to determine when an identified state occurs. Either or both of the interventions and criteria associated with an identified state may be included in one or more response templates. Receiving data and/or signals from one or more sensors 304. The one or more sensors and the data and/or signals received from the sensors may include any of those described above with reference to FIGS. 1 and 2. Analyzing the received data and/or signals 306. Analyzing the received data and/or signals may include applying criteria as described above with reference to FIG. 1. Determining when an identified state is occurring 308. An identified state may be determined to occur when one or more thresholds are exceeded and/or one or more indications are received as described above with reference to FIG. 1. Modify response of one or more controls 310. The response of the one or more controls may be modified as described above with reference to FIGS. 1 and 2. Determining abatement of identified state 312. The identified state may be determined to be in abatement (e.g. no longer occurring) when the criteria used in act 308 are no longer met. Restoring the control responses 314. Restoring the control responses may include returning the responses to the state they had before they were modified in act 310. Alternatively, or in addition, restoring the control responses may include putting the control responses in a state they would otherwise have had were they not modified in act 310.

Figure 4:
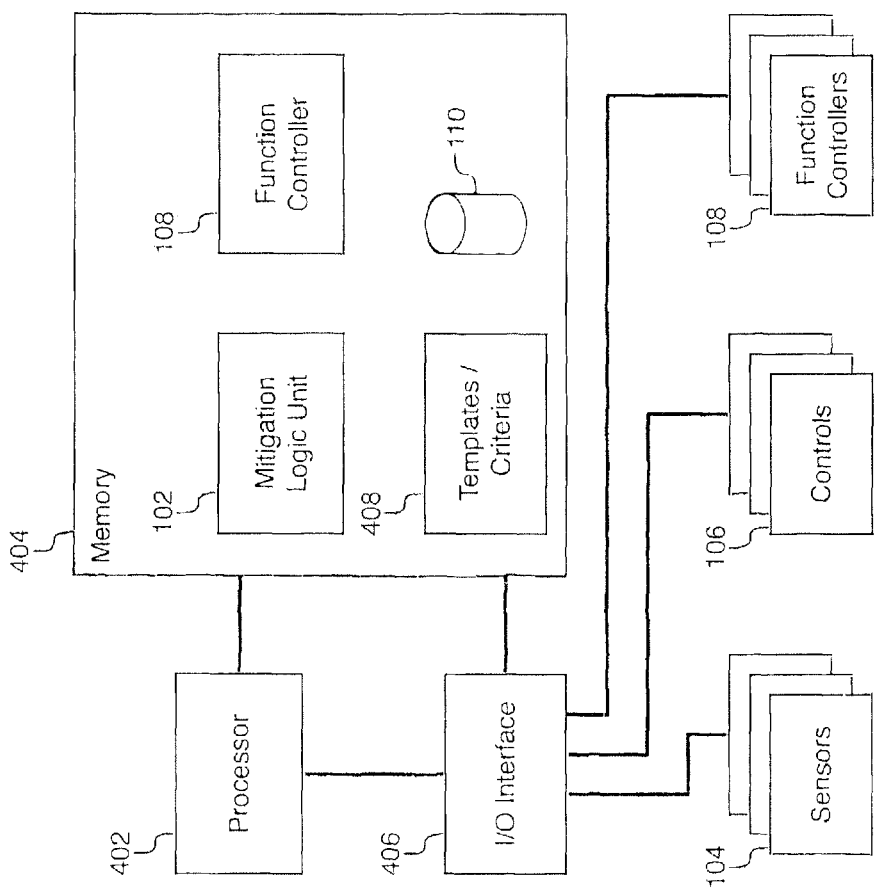
FIG. 4 is a further schematic representation of a system for mitigating unintended operation of in-vehicle controls.

FIG. 4 is a further schematic representation of a system for mitigating unintended operation of in-vehicle controls. The system 400 comprises a processor 402, memory 404 (the contents of which are accessible by the processor 402) and an I/O interface 406. The memory 404 may store instructions which when executed using the process 402 may cause the system 400 to render the functionality associated with the mitigation logic unit 102 and one or more function controllers 108 as described herein. In addition the memory 404 may store data and/or signals 110 received from one or more controls 106 and criteria associated with one or more identified states, including response templates, as described herein 408.

The processor 402 may comprise a single processor or multiple processors that may be disposed on a single chip, on multiple devices or distributed over more than one system. The processor 402 may be hardware that executes computer executable instructions or computer code embodied in the memory 404 or in other memory to perform one or more features of the system. The processor 402 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 404 may comprise a device for storing and retrieving data, processor executable instructions, or any combination thereof. The memory 404 may include non-volatile and/or volatile memory, such as a random access memory (RAM), a read-only memory (ROM), an erasable programmable read-only memory (EPROM), or a flash memory. The memory 404 may comprise a single device or multiple devices that may be disposed on one or more dedicated memory devices or on a processor or other similar device. Alternatively or in addition, the memory 404 may include an optical, magnetic (hard-drive) or any other form of data storage device.

The memory 404 may store computer code, such as instructions for providing the functions of the mitigation logic unit 102 and one or more function controllers 108 as described herein. The computer code may include instructions executable with the processor 402. The computer code may be written in any computer language, such as C, C++, assembly language, channel program code, and/or any combination of computer languages. The memory 404 may store information in data structures including, for example, data and/or signals 110 received from one or more controls 106 and criteria associated with one or more identified states, including response templates 408.

The I/O interface 406 may be used to connect devices such as, for example, the sensors 104, the controls 106, the function controls 108 and to other components of the system 400.

All of the disclosure, regardless of the particular implementation described, is exemplary in nature, rather than limiting. The systems 100 and 400 may include more, fewer, or different components than illustrated in FIGS. 1 and 4. Furthermore, each one of the components of systems 100 and 400 may include more, fewer, or different elements than is illustrated in FIGS. 1 and 4. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for mitigating unintended operation of in-vehicle controls have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for mitigating unintended operation of a vehicle comprising:
   receiving data or signals from one or more sensors;
   analyzing, at a processor, the received data or signals;
   responsive to the analyzing at the processor, determining that a vehicle is in an operating state that may cause inadvertent contact with a control of the vehicle, the control selected from a group consisting of a steering wheel mounted control, a gear shift lever, a dash mounted control and a touch display; and
   in response to determining that the vehicle is in the operating state that may cause inadvertent contact with the control, requiring a longer duration operation of the control to activate a function associated with the control than is required to activate the operation of the control prior to determining that the vehicle is in the operating state that may cause inadvertent contact with the control.

2. The method of claim 1, where the operating state corresponds to a change in a direction of the vehicle.

3. The method of claim 1, where the operating state corresponds to a change in a dynamic state of the vehicle.

4. The method of claim 1, where the operating state corresponds to a change in a status of the vehicle.

5. The method of claim 1, where analyzing the received data or signals comprises analyzing a combination of a plurality of current operating values and a plurality of historical operating values.

6. The method of claim 1, further comprising:
   determining abatement of the operating state at the processor; and
   after determining abatement of the operating state at the processor, restoring the response to the control to a state the response to the control had prior to modification thereof.

7. The method of claim 1, where modifying is pre-programmed in user configurable templates.

8. The method of claim 1, where determining when the operating state is occurring comprises executing user configurable templates.

9. The method of claim 1, wherein modifying the response to the one or more controls of the vehicle includes requiring a confirmation action after an initial control operation in order to activate the corresponding function.

10. The method of claim 1, wherein the control includes a button.

11. The method of claim 1, wherein requiring the longer duration operation includes requiring a long button press.

12. The method of claim 1, further comprising, in response to determining that the vehicle is in the operating state that may cause inadvertent contact with the control, disabling or modifying one or more modes available for activating a multi-modal controlled function.

13. A vehicle comprising:
a sensor that detects or measures an operating state of the vehicle and outputs data;
a control selected from the group consisting of a steering wheel mounted control, a gear shift lever, a dash mounted control and a touch display;
a function controller of the vehicle responsive to the control; and
a mitigation logic unit programmed to:
receive the data output by the sensor;
determine, by analyzing the output data and criteria stored in a configurable template within the vehicle, that the vehicle is in an operating state that may cause inadvertent contact with the control; and
in response to determining that the vehicle is in the operating state that may cause inadvertent contact with the control, require a longer duration operation of the control to activate a function associated with the control than is required to activate the operation of the control prior to determining that the vehicle is in the operating state that may cause inadvertent contact with the control.

14. The vehicle of claim 13, where the mitigation logic unit is programmed to cancel an input from the control before it is processed by the function controller.

15. The vehicle of claim 13, where the mitigation logic unit provides a plurality of inputs to the function controller causing the function controller to modify the function of the function controller response.

16. The vehicle of claim 13, where the function controller returns response to the control to a state the response to the control had prior to modification thereof.

17. The vehicle of claim 13 wherein the operating state corresponds to a change in a direction of the vehicle.

18. The vehicle of claim 13 wherein the operating state corresponds to a change in a dynamic state of the vehicle.

19. A computer readable medium storing a program in a non-transient media, the program comprising:
computer program code that processes data received from one or more sensors when executed by a processor;
computer program code that analyzes the received data when executed by the processor;
computer program code that, when executed by the processor in response to the analyzing, determines that a vehicle is in an operating state that may cause inadvertent contact with a control of the vehicle selected from the group consisting of a steering wheel mounted control, a gear shift lever, a dash mounted control and a touch display; and
computer program code that, in response to determining that the vehicle is in the operating state that may cause inadvertent contact with the control, requires a longer duration operation of the control to activate a function associated with the control than is required to activate the operation of the control prior to determining that the vehicle is in the operating state that may cause inadvertent contact with the control.

20. The computer readable medium of claim 19 where the analyzing of the received data comprises analyzing a combination of a plurality of current operating values and a plurality of historical operating values.

* * * * *